United States Patent
Davidson et al.

(10) Patent No.: US 6,266,153 B1
(45) Date of Patent: Jul. 24, 2001

(54) IMAGE FORMING DEVICE HAVING A REDUCED TONER CONSUMPTION MODE

(75) Inventors: Michael L. Davidson, deceased, late of Rochester, by Dona Davidson, executrix; Brian C. Hawkins, Rochester, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/076,034

(22) Filed: May 12, 1998

(51) Int. Cl.[7] ............................................... G06F 9/44

(52) U.S. Cl. .................................. 358/1.9; 382/274

(58) Field of Search ..................... 358/1.9; 382/258–259, 382/270, 274, 163, 166–167, 205, 209

(56) References Cited

U.S. PATENT DOCUMENTS

| | | | |
|---|---|---|---|
| 3,597,071 | 8/1971 | Jones | 355/111 |
| 4,544,264 | 10/1985 | Bassetti et al. | 355/14 |
| 4,558,370 | 12/1985 | Mitchell et al. | 358/260 |
| 4,625,222 | 11/1986 | Bassetti et al. | 346/160 |
| 4,675,733 | 6/1987 | Tanimoto | 358/138 |
| 4,821,107 | 4/1989 | Naito et al. | 358/256 |
| 4,847,641 | 7/1989 | Tung | 346/154 |
| 4,847,677 | 7/1989 | Music et al. | 358/13 |
| 5,005,139 | 4/1991 | Tung | 364/519 |
| 5,021,892 | 6/1991 | Kita et al. | 358/468 |
| 5,029,108 | 7/1991 | Lung | 364/519 |
| 5,047,955 | 9/1991 | Shope et al. | 364/519 |
| 5,056,154 | 10/1991 | Aono et al. | 382/56 |
| 5,109,437 | 4/1992 | Honda | 382/56 |
| 5,170,340 | 12/1992 | Prokop et al. | 364/143 |
| 5,175,633 | 12/1992 | Saito et al. | 358/406 |

(List continued on next page.)

OTHER PUBLICATIONS

J. C. Stoffel et al., "A Survey of Electronic Techniques for Pictorial Image Reproduction", *IEEE Transactions on Communications*, vol. COM–29, No. 12, Dec. 1981, pp. 1898–1925.

J. Randolph Sandors et al., *Behind Hewlett–Packard's Patent on Resolution Enhancement™ Technology*, Torrey Pines Research, 1990, pp. 1–61.

Edward R. Dougherty et al., "Efficient Design Strategies for the Optimal Binary Digital Morphological Filter: Probabilities, Constraints, and Structuring–Element Libraries", *Mathematic Morphology in Image Processing*, 1992, pp. 43–90.

"Morphological Image and Signal Processing", *6.2 Erosion and Dilation in the Euclidean Space*, pp. 158–167.

*Primary Examiner*—Thomas D. Lee
*Assistant Examiner*—Stephen Brinich
(74) *Attorney, Agent, or Firm*—Oliff & Berridge, PLC.

(57) ABSTRACT

An image forming device includes a toner saving mode that converts embedded pixels to a lighter density based on an embedded pixel template and an embedded pixel image data value. An embedded pixel is a pixel surrounded by a number of neighboring pixels that have the same image data value as the surrounded pixel. The embedded image data value can be predetermined or selectable. The image data value preferably corresponds to a black pixel. The image data value of the identified embedded pixels is altered to an output image data value corresponding to a lower density. The altered image data value preferably corresponds to a white pixel. The template used to identify the embedded pixel preferably includes a center pixel of interest and the four edge-adjacent neighboring pixels. The image forming device, when in the toner save mode, thus prints embedded pixel areas originally having a density at least equal to the embedded image data value at the lower density output image data value. Thus, less toner is used in the toner save mode.

19 Claims, 11 Drawing Sheets

U.S. PATENT DOCUMENTS

| | | | |
|---|---|---|---|
| 5,206,741 | 4/1993 | Shimura et al. | 358/404 |
| 5,223,948 | 6/1993 | Sakurai et al. | 358/404 |
| 5,237,316 | 8/1993 | Cox, Jr. et al. | 340/731 |
| 5,276,799 | 1/1994 | Rivshin | 395/162 |
| 5,301,262 | 4/1994 | Kashiwagi | 395/117 |
| 5,307,458 | 4/1994 | Freiburg et al. | 395/162 |
| 5,404,411 | 4/1995 | Banton et al. | 382/54 |
| 5,408,329 | 4/1995 | Mailloux et al. | 358/298 |
| 5,579,445 | 11/1996 | Loce et al. | 395/102 |
| 5,666,470 | 9/1997 | Parker | 395/106 |
| 5,687,297 | 11/1997 | Coonan et al. | 395/102 |
| 5,799,136 * | 8/1998 | Li et al. | 395/109 |
| 5,852,678 * | 12/1998 | Shiau et al. | 382/205 |
| 5,860,047 * | 1/1999 | Hernandez | 339/181 |

* cited by examiner

IMAGE FORMING DEVICE HAVING A REDUCED TONER CONSUMPTION MODE

BACKGROUND OF THE INVENTION

1. Field of Invention

This invention relates to modifying an appearance of an image formed by an image forming device. More particularly, this invention is directed to a method and apparatus for detecting embedded pixels of an image and altering the level of such detected embedded pixels when forming a hard copy of the image.

2. Description of Related Art

U.S. Pat. Nos. 5,666,470 to Parker and 5,687,297 to Coonan et al., each co-owned by the assignee of this application and each incorporated by reference herein in its entirety, are directed to image forming systems that allow the appearance of a printed copy of an image to be tuned. Particularly, the various definitions and image appearance tuning systems and methods set forth in the incorporated '470 and '297 patents are specifically incorporated herein.

In particular, each of these patents is directed to an image forming device that forms an image based on a bitmap, i.e., a one-bit-depth image data map, or a bytemap i.e., a multi-bit-depth image data map. The appearance tuning systems of these patents apply morphological filters to the bitmap or bytemap to determine which pixels of the bitmap or bytemap require appearance tuning. In particular, the appearance tuning systems disclosed in these patents apply predefined templates to the bitmap or bytemap and scan the templates on a pixel-by-pixel basis over the bitmap or bytemap. Each template defines a different pattern of image data values for a center pixel of interest and one or more adjacent, or "neighboring," pixels of the bitmap or bytemap. If the center pixel of interest and its neighboring pixels do not match any of the predetermined templates, the appearance of the center pixel of interest is not altered. Otherwise, depending on which of the predetermined templates is matched by the center pixel of interest and its neighboring pixels, the appearance of the center pixel of interest is altered to tune the overall appearance of the image to be formed.

In particular, the '470 patent is directed to dilation or erosion of the image data value of the pixel of interest to smooth the transition from neighboring black pixels to neighboring white pixels. In particular, dilation refers to increasing the density of the pixel of interest, i.e., making the pixel of interest darker. In contrast, erosion refers to decreasing the density of the pixel of interest, i.e., making the pixel of interest lighter. The '297 patent also modifies the image data value of the pixel of interest to increase or decrease its image data value based on the image data values of its neighboring pixels. In general, the '297 patent differs from the '470 patent primarily in the set of predetermined templates that are used in the template matching or morphological filtering operation.

SUMMARY OF THE INVENTION

Because both the '470 patent and the '297 patent are directed to appearance tuning, the appearance tuning systems disclosed in these patents are unconcerned with situations where the pixel of interest and the neighboring pixels to the pixel of interest all have the same image data value. That is, if the pixel of interest and the neighboring pixels are not in a region of the image where the image data values are changing, the '470 and '297 patents indicate there is no need to tune the appearance of the image.

However, images often contain large regions where the image density values of the pixels is constant. For example, in the image 100 shown in FIG. 1, two portions 110 and 120 define large regions of very dense pixels. For example, in a bitmap, the pixels of the regions 110 and 120 would be black pixels. In a bytemap, such as a grayscale bytemap printed on a monochrome image forming device or a single color separation layer of a full color image forming device, the regions 110 and 120 could be black or very dark gray or dense regions of a color separation layer.

In a finalized image that is to be used for its intended purposes, it is necessary that the regions 110 and 120 be completely filled in. However, this consumes a great deal of toner or ink. Using such large amounts of toner or ink is environmentally detrimental for a number of reasons. First, the toner or ink is consumed much more rapidly, requiring removal and disposal of the toner or ink cartridge. Even if the toner or ink cartridge is recycled, consuming more toner or ink cartridges than is necessary is nonetheless environmentally detrimental.

Second, even if the image recording medium, such as paper, on which the image is formed is itself ultimately recycled, part of the recycling process requires removing the toner from the recycled paper. Thus, even if the toner or ink is not wasted, it must still ultimately be disposed of Finally, during creation of the image, and for many uses of the image, it is not necessary to completely fill in the regions 110 and 120 with the ink or toner. Rather, for many proofing and functional uses of the image 100, all that is necessary is to know the location of the regions 110 and 120. Thus, when forming the image 110 for such proofing or functional uses, consuming the toner or ink to completely fill in the regions 110 and 120 essentially wastes the toner or ink. This wasted toner or ink both must be disposed of when the image recording medium carrying the image 100 is recycled, and causes the toner or ink cartridges to be consumed faster than necessary, as described above.

Accordingly, it would be beneficial to be able to form the image 100 without filling in the regions 110 and 120 with ink, while maintaining the outlines 112 and 122 of the regions 110 and 120. In particular, the portions 114 and 124 of the regions 110 and 120 of the image 100 are "embedded" regions. By reducing the image data values of the pixels in these embedded regions 114 and 124, i.e., by making the pixels of these embedded regions 114 and 124 lighter, it is possible to reduce the consumption of the toner or ink. In particular, according to one embodiment of this invention, "embedded" pixels are center pixels which are surrounded by the immediately adjacent above and below and left and right pixels having the same image data value as the center pixel.

Thus, this invention provides a method and apparatus that identifies embedded pixels within a bitmap or bytemap image.

This invention further provides a method and apparatus that alters, in response to downloadable output values, identified embedded pixels.

This invention also provides a method and apparatus that produces an image in which essentially all print information is retained by removing embedded pixels while leaving outlining pixels unchanged.

This invention also provides a method and apparatus that include a user-specifiable low-toner consumption mode for generating a bitmap or bytemap image using an image forming device.

This invention additionally provides a method and apparatus that produces an image that replaces embedded pixel regions with outline regions suitable for proof printing and functional copying.

The system and method of this invention includes providing an image forming device with one or more embedded pixel templates for identifying embedded pixels. The method and apparatus of this invention scan an input bitmap or bytemap image on a pixel-by-pixel basis using the embedded pixel templates to locate embedded pixels. The method and apparatus of this invention reduce the density of the image data value of each such embedded pixel. This reduces the required toner to print that embedded pixel.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 4:
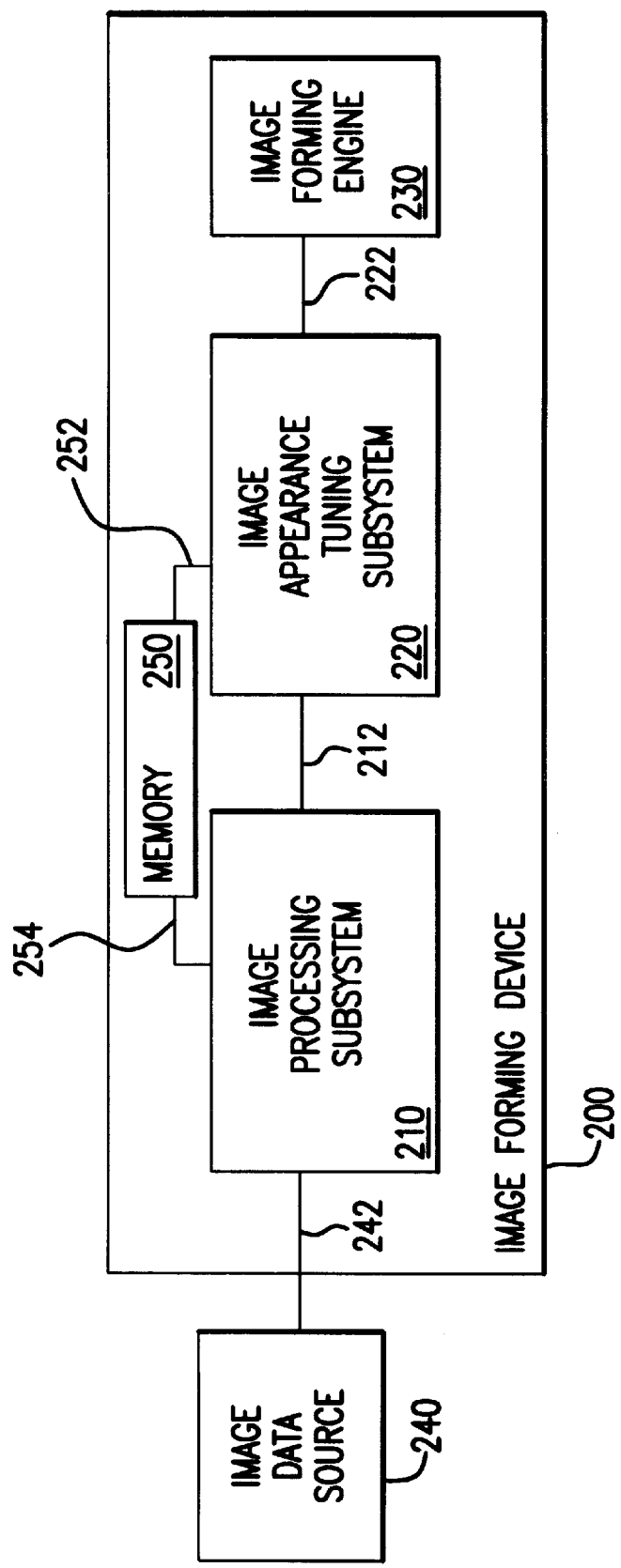
FIG. 4 is a block diagram of an image forming device according to this invention.

FIG. 4 shows a block diagram of an image forming device 200 according to this invention. As shown in FIG. 4, the image forming device 200 inputs image data from an image data source 240 over a signal line 242. The image data from the image data source 240 is input to an image processing subsystem 210. The image processing subsystem 210 applies any necessary processing to the image data provided by the image data source 240 to generate or modify one or more bitmaps or bytemaps. The bitmaps or bytemaps output by the image processing subsystem 210 are those bitmaps or bytemaps required by the image forming engine 230 to form an image on an image recording medium or a display screen.

Accordingly, the image data provided by the image data source 240 over the signal line 242 can be in any known form, including binary bitmap images, grayscale bytemap images, multi-bit continuous tone black-and-white or color images, half-tone images, a page description language, or the like. Additionally, these images can contain photographic images stored in JPEG, GIF or the like formats. In particular, with respect to the invention described herein, the image data provided by the image data source 240 over the link 242 can be in any format currently known or subsequently developed, so long as the image processing subsystem 210 can convert that image into one or more bitmaps or bytemaps.

The image forming device 200 can be a digital electronic copier. In this case, the image data source 240 is an integral part of the image forming device 200 and is a scanner or other image capturing device. Again, the image data source 240 in this case can again be any currently known or future developed image capturing device, so long as the image processing subsystem 210 can convert the captured image supplied by the image data source 240 into one or more bitmaps or bytemaps.

Finally, the signal line 242 can be a direct hardwired signal line between the image data source 240 and the image processing subsystem 210, as would be the case when the image forming device 200 is a digital electronic copier or when the image forming device is directly connected to a desktop or laptop computer forming the image data source 240. Additionally, the signal line 242 can be a local area network, a wide area network, an intranet, the Internet, or any other distributed node network. In this case, the image data source 240 is likely to be a node of such a distributed network, such as a server, a desktop or laptop computer, or the like. In this case, the image forming device 200 could be a raster output scanner (ROS)-type laser printer, a full-width-array print bar-type laser printer, an ink jet printer, a dot matrix printer, or the like. In particular, the image forming engine 230 can be any conventional image forming engine, such as those outlined above, or any future developed device which inputs and generates an image on a image recording medium based on bitmap or bytemap image data.

In accordance with the embedded pixel modifying method and apparatus of this invention, the one or more bitmaps or bytemaps generated by the image processing subsystem 210 from the image data output by the image data source 240 are input to an image appearance tuning subsystem 220. In accordance with this invention, the image appearance tuning subsystem 220 analyzes each of the bitmaps or bytemaps to locate embedded pixels. As outlined above, an embedded pixel is a pixel having the same image data value as each of its adjacent neighbors.

For either a predetermined or a selected input image data value, the image appearance tuning subsystem 220 analyzes each of the bitmaps or bytemaps to locate embedded pixels to be modified based on that predetermined or selected image data value. For each such identified pixel, the image appearance tuning subsystem 220 modifies the image data value of that embedded pixel based on a predetermined or a selected output image data value and outputs that embedded pixel with the modified image data value to the image forming engine 230 over a signal line 222. Otherwise, if a pixel is not an embedded pixel, the image appearance tuning subsystem 220 outputs that pixel having an unchanged image data value to the image forming engine 230 over the signal line 222. Alternatively, as set forth below, the image appearance tuning subsystem 220 could also apply other image tuning templates to the pixel before outputting that pixel to the image forming engine 230.

The predetermined or selected input and output image data values can be stored in a memory 250 and read out of the memory 250 by the image appearance tuning subsystem 220. As shown in the incorporated '470 and '297 patents, the image appearance tuning subsystem 220 can apply a number of different appearance tuning operations to an input image, of which the embedded pixel identification and modification operation of this invention is just one. Thus, depending on whether the embedded pixel identification and modification operation has been selected for use in the image appearance tuning subsystem 220, the predetermined or selected input and output data values will be transferred from the memory 250 to the image appearance tuning subsystem 220.

Figure 3:
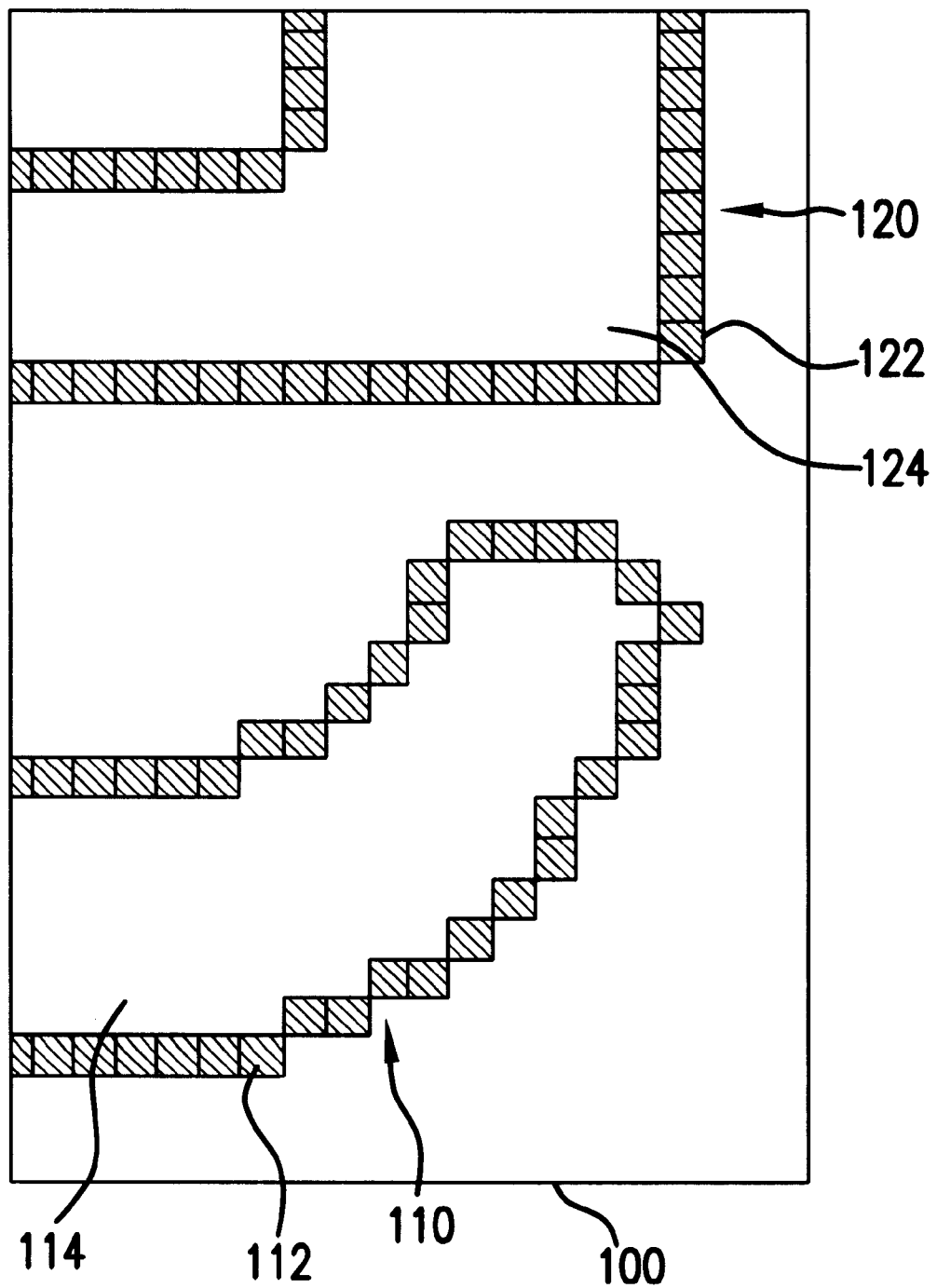
FIG. 3 is the exemplary bitmap or bytemap image shown in FIG. 1, wherein the image data values of the embedded pixels have been altered to image data values for white pixels.

As outlined above, the image processing subsystem 210 can output one or more bitmaps or one or more bytemaps to the image appearance tuning subsystem 220. For example, the image processing subsystem 210 could output a single bitmap, representing a black-and-white image. In this case, the image appearance tuning subsystem 220 would locate the embedded black pixels and convert their image data value from "black" to "white". This conversion can be seen by comparing FIGS. 1 and 3, assuming the regions 110 and 120 represent pixels having "black" image data values.

When the image data received by the image processing subsystem 210 is not a black-and-white image, but is a color image, and the image forming engine 230 forms color images using four bitmap image color separation layers, the image processing subsystem 210 will output four bitmaps over the signal line 212. In this case, each bitmap represents one of the color separation layers to be input by the image forming engine 230 to form the full color image on the image recording medium. In this case, the image appearance tuning subsystem 220 will convert each of the four color separation layer bitmaps as outlined above.

In contrast, when the image forming engine 230 is able to form image pixels of the output image having intermediate image data values between "black" and "white", the image processing subsystem 210 will output one or more bytemaps over the single line 212. In this case, the term "bytemap," while usually signifying image data having eight bits per pixel, is being used more generally to indicate image data having two or more bits per pixel. Thus, the "bytemaps" output by the image processing subsystem 210 could have two bits per pixel, four bits per pixel, eight bits per pixel, or any other number of bits per pixel.

In this case, the image appearance tuning subsystem 220 is not limited to merely converting black embedded pixels to white pixels, as in the case of bitmap image data. Rather, the image appearance tuning subsystem 220 can modify just the black pixels to white pixels, or it can modify all embedded pixels having an image data value equal to or darker than a selected level to white pixels, all non-white embedded pixels to white pixels, or all black embedded pixels to lower density, but non-white, pixels. More generally, the image appearance tuning subsystem 220 can convert embedded pixels having any single image data value, or any data value equal to or greater than a particular image data value, to pixels having any other desired image data value.

Figure 1:
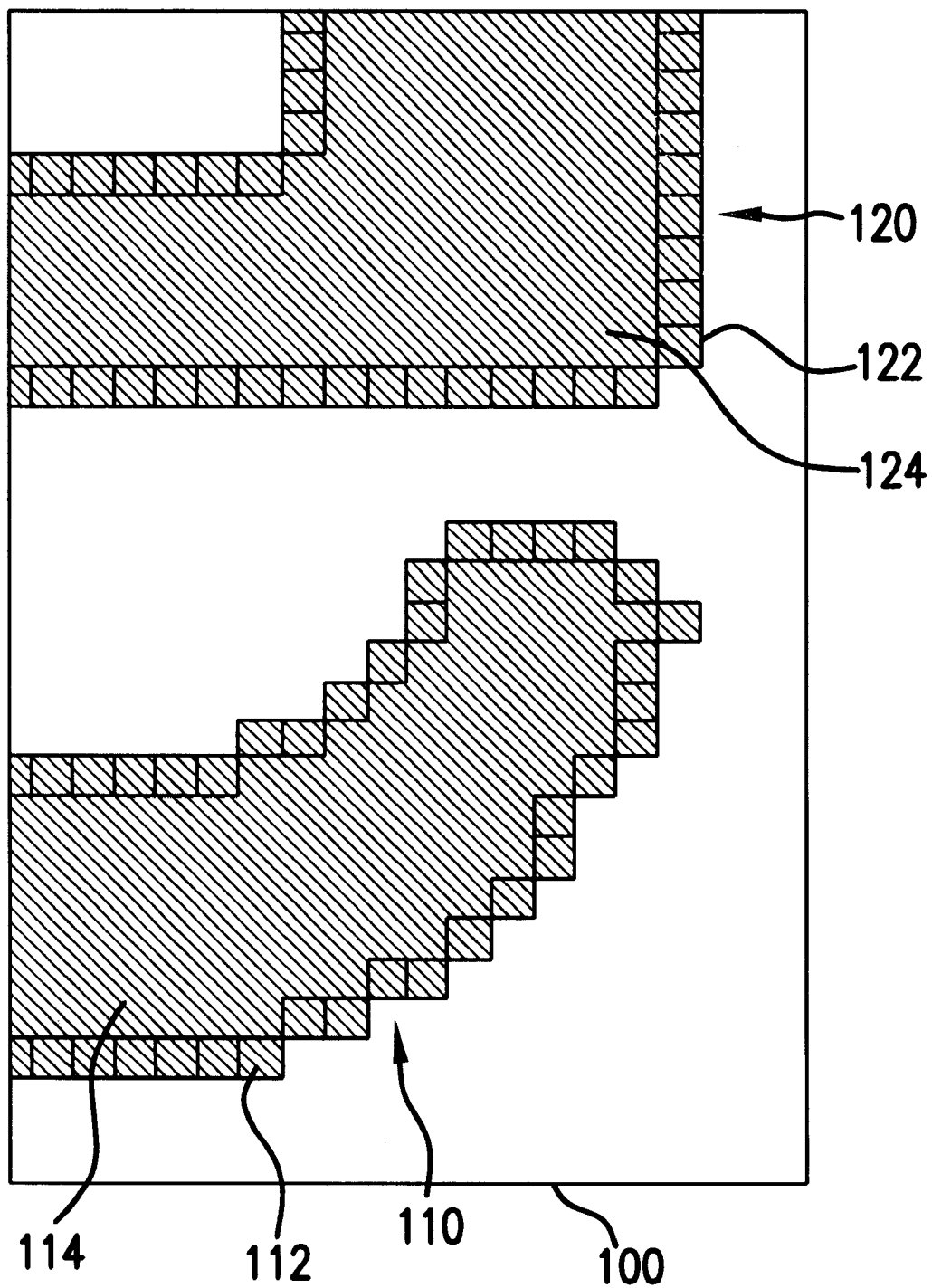
FIG. 1 is an exemplary portion of an input bitmap or bytemap image.
Figure 2:
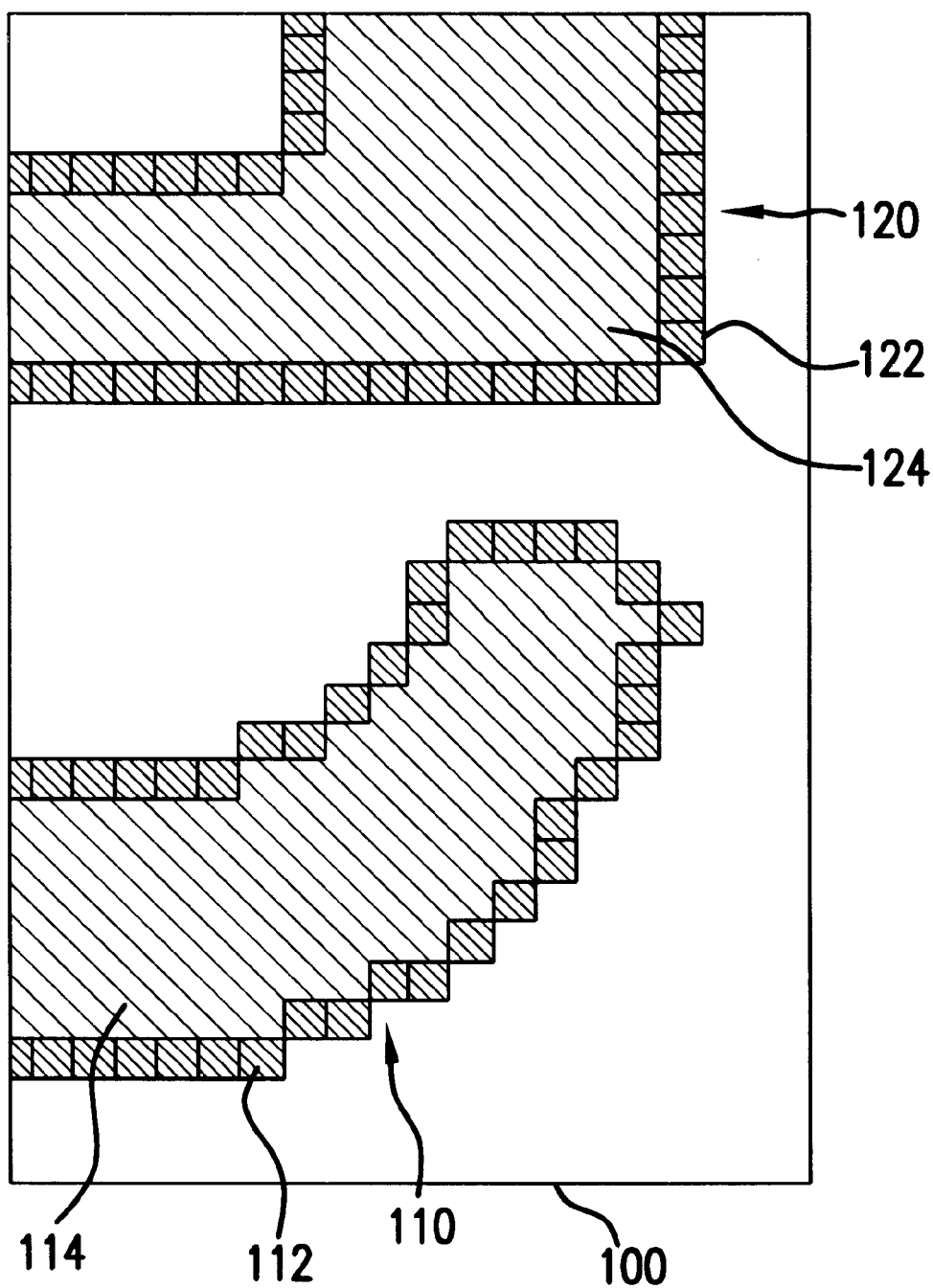
FIG. 2 is the exemplary bitmap or bytemap image shown in FIG. 1, wherein the image data values of the embedded pixels have been altered to lighter density values.

This can be seen by comparing FIGS. 1 and 2. Assuming the regions 110 and 120 represent black pixels in FIG. 1, the embedded regions 114 and 124 in FIG. 2 can represent gray pixels. As another example, if the regions 110 and 120 in FIG. 1 instead represent dark gray pixels, the embedded regions 114 and 124 in FIG. 2 could represent light gray regions.

Figure 5:
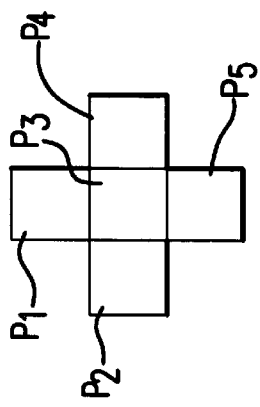
FIG. 5 shows an exemplary template used by the image appearance tuning subsystem of FIG. 4 according to this invention.

FIG. 5 shows the preferred template to be used by the image appearance tuning subsystem 220 to identify or locate embedded pixels. In particular, as shown in FIG. 5, a pixel of interest $P_3$ is an embedded pixel if each of the edge-adjacent pixels $P_1$, $P_2$, $P_4$ and $P_5$ have the same image data value as the pixel of interest $P_3$. It should be appreciated that other templates could be used by the image appearance tuning subsystem 220. In particular, the template shown in FIG. 5 could be modified by requiring that one or more of the corner-adjacent pixels, i.e., the diagonally-adjacent pixels, to the pixel of interest $P_3$, must also have the same image data value as the pixel of interest $P_3$. Furthermore, templates including any three of the corner-adjacent pixels or any two of the corner-adjacent pixels could be used by the image appearance tuning subsystem 220 to locate embedded pixels in the bitmaps or bytemaps received from the image processing subsystem 210.

Accordingly, because the image appearance tuning subsystem 220 uses the template described above with respect to FIG. 5 to locate the embedded pixels in the bitmaps or bytemaps received from the image processing subsystem 210, any of the template matching embodiments described in the incorporated '470 and '297 patents can be used as the image appearance tuning subsystem 210 by incorporating the appropriate templates.

Figure 6:
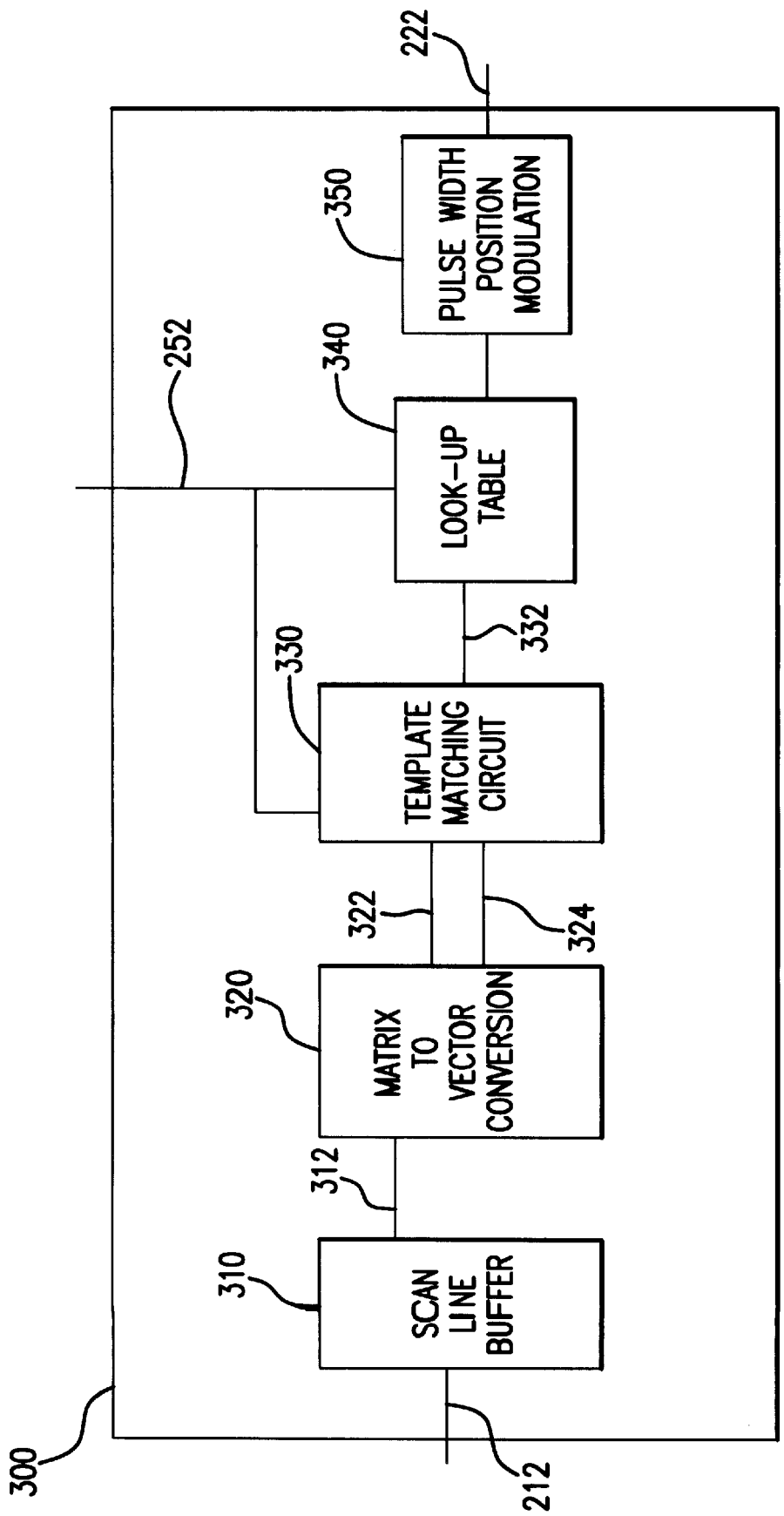
FIG. 6 shows in greater detail a one embodiment of the image appearance tuning subsystem of FIG. 4 according to this invention.

FIG. 6 shows one preferred embodiment 300 of the appearance tuning subsystem 210 according to this invention. As shown in FIG. 6, the appearance tuning subsystem 300 of this embodiment includes a scan line buffer 310. The scan line buffer 310 is designed to receive rasters of image data from the image processing subsystem 210 and store that data sequentially. Because the data is sequentially stored into and read out of the scan line buffer 310, the scan line buffer 310 is preferably implemented as a first-in, first-out (IFO) memory. Once stored in the scan line buffer 310, the image data for the specified template, or context window, for example, the template shown in FIG. 5, is output over a signal line 312 to a matrix-to-vector conversion circuit 320. Because the template shown in FIG. 5 uses pixels from three sequential scan lines, the signal line 312 preferably includes three separate signal lines, one for each scan line used by the template shown in FIG. 5. It should be appreciated that, if the template used to locate embedded pixels uses pixels from more than three sequential scan lines, the number of signal lines 312 will be equal to the number of different scan lines the template uses to determine embedded pixels.

The matrix-to-vector conversion circuit 320 converts the image data values input over the signal line 312 into a "vector" representing the data values of the pixel of interest and the neighboring pixels corresponding to the specified template. The vector is transferred over the signal line 322 to a template matching circuit 330, while the data value for the center pixel signal is transmitted over a signal line 324 to the template matching circuit 330.

In the template matching circuit 330, the vector is compared to the specified template to determine whether the center pixel of interest and the neighbor pixels all have the same data value and to determine if that data value has the correct relation to the embedded pixel template. In particular, if the specified embedded pixel template, or one of the embedded pixel templates if more than a single embedded pixel template has been specified, is matched, the template matching circuit 330 will output on the signal line 332 a value to a look-up table 340. The value indicates, if a single template is specified, that the single template was matched, or, if more than one template has been specified, the number or code of the template that was matched. Otherwise, if the single template was not matched, or none of a number of templates were matched, the template matching circuit 330 outputs the center pixel data value, received from the matrix-to-vector conversion circuit 320 over the signal line 324, over the signal line 332 to the look-up table 340.

The look-up table 340 (LUT) inputs the value from the template matching circuit 330, and outputs the data value stored at the address represented by that value. In particular, the look-up table 340 is a programmable look-up table where the value input on the signal line 332 is used as an address. Based on the address supplied to the look-up table 340 on the signal line 332, the look-up table 340 outputs the appropriate pulse-width, position-modulation (PWPM) signal on the signal line 342. It should be appreciated that the look-up table 340 is preferably a programmable device, capable of storing data downloaded from the memory 250 on the signal line 252 to the look-up table 340 in response to a user input. Thus, upon identifying whether the center pixel of interest is an embedded pixel in the template matching circuit 330, the PWPM signal output by the look-up table 340 will result in the image data value of the center pixel of interest being altered, or set, to the selected output image data value, such as, for example, the image data value for a white pixel.

Alternatively, in another possible operation of the temple matching circuit 330, if the single template was not matched, or none of the number of templates were matched, the temple matching circuit would output a code corresponding to a "no match" template over the signal line 332 to the look-up table 340. In general, the "no match" template is implemented by establishing "don't care" conditions for each of the adjacent pixels of the template, with the code indicating the value of the center pixel of interest. In general, in response to the no match code, the look-up table 340 outputs the appropriate PWPM signal on the signal line 342 for the original value of the center pixel of interest.

It should be appreciated that if the other appearance tuning modes disclosed in the '470 and '297 patents are also implemented in the appearance tuning subsystem 300, the embedded black pixel condition could be defined as corresponding to the "no match" condition, relative to the other appearance tuning templates disclosed in the '470 and the '297 patents. hi this case, the "no match" template is used by the template matching circuit 330 to generate and output the embedded black pixel code to the look-up table 340.

Figure 9:
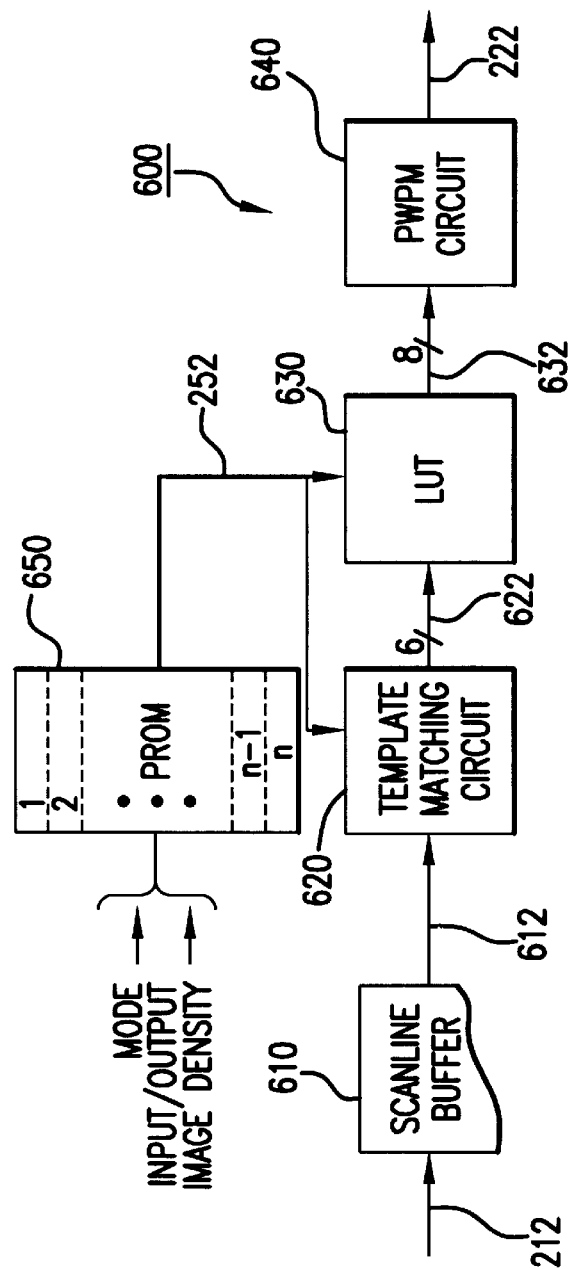
FIG. 9 shows in greater detail another embodiment of the image appearance tuning subsystem of FIG. 4 according to this invention.
Figure 7:
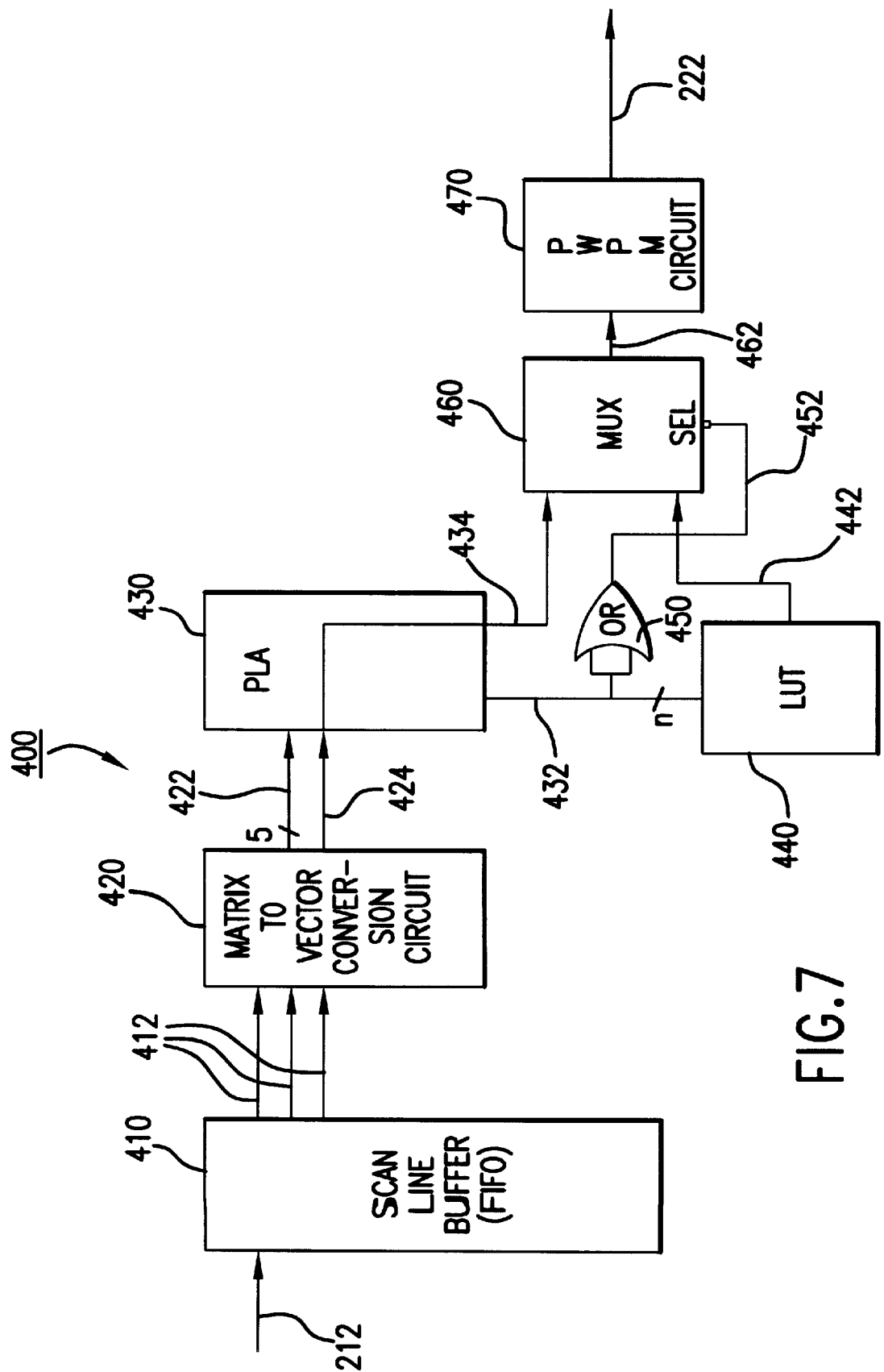
FIG. 7 shows in greater detail another embodiment of the image appearance tuning subsystem of FIG. 4 according to this invention.
Figure 8:
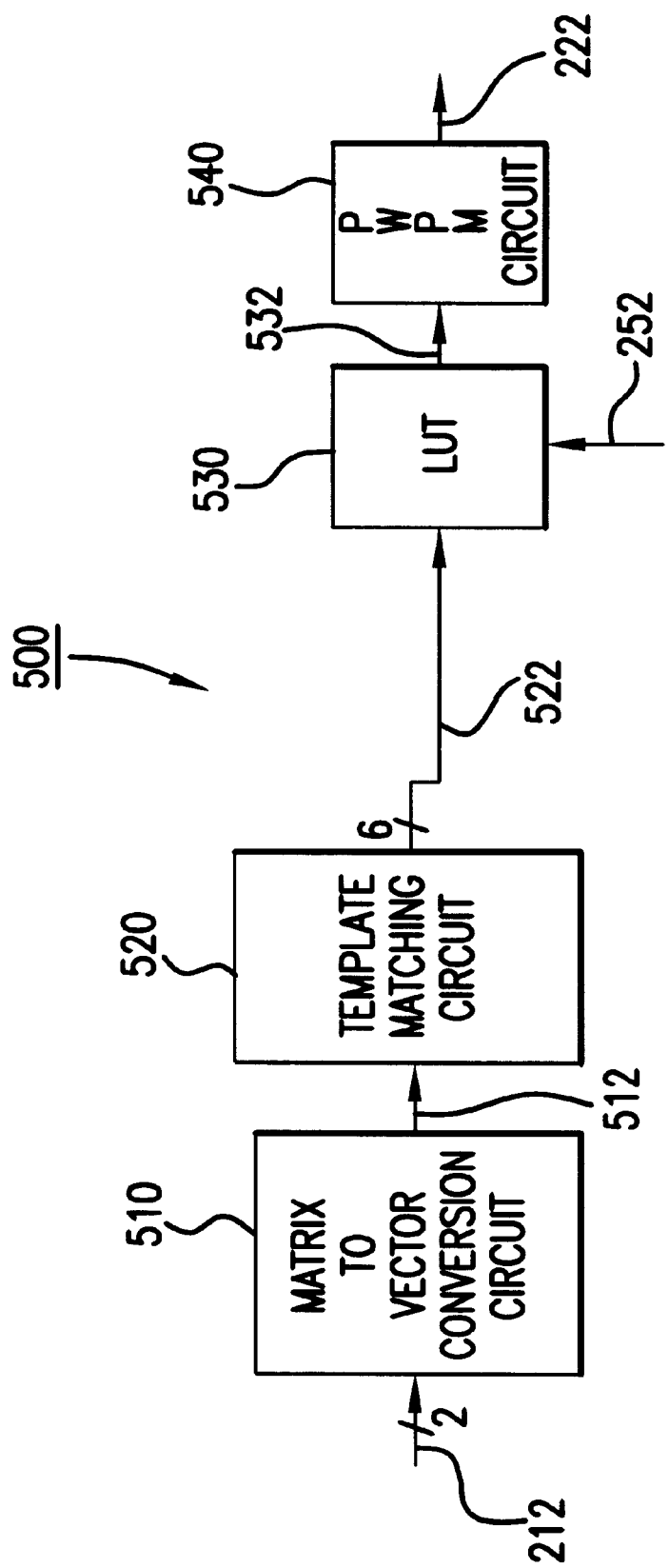
FIG. 8 shows in greater detail another embodiment of the image appearance tuning subsystem of FIG. 4 according to this invention.

FIGS. 7–9 show three preferred embodiments of the image tuning subsystem 210. While the structure and operation of these embodiments shown in FIGS. 7–9 are described below, a more extensive description of FIGS. 7 and 8, and 9 are provided in the incorporated '470 and '297 patents, respectively. In particular, the embodiments of the image appearance tuning subsystem 220 shown in FIGS. 7–9 have been simplified relative to the corresponding figures in the '470 and '297 patents, to avoid issues solely related to the particular embodiments or particular types of appearance tuning performed on the '470 and '279 patents that are unrelated to the embedded pixel identification and modification of this invention.

In one preferred embodiment 400 of the appearance tuning subsystem 210, as shown in FIG. 7, the appearance tuning subsystem 400 of this embodiment includes a scan line buffer 410. The scan line buffer 410 is designed to receive rasters of image data from the image processing subsystem 210 and store that data sequentially. Because the data is sequentially stored into and read out of the scan line buffer 410, the scan line buffer 410 is preferably implemented as a first-in, first-out (FIFO) memory. For example, the scan line buffer 410 may be implemented as a series of one-dimensional shift registers. Once stored in the scan line buffer 410, the image data for the specified template, or context window, as represented by the template shown in FIG. 5, is output over the signal lines 412 to a matrix-to-vector conversion circuit 420. Because the template shown in FIG. 5 uses pixels from three sequential scan lines, the signal lines 412 comprise three separate signal lines, one for each scan line used by the template shown in FIG. 5. It should be appreciated that, if the template used to locate embedded pixels uses pixels from more than three sequential scan lines, the number of signal lines 412 will be equal to the number of different scan lines the template uses to determine embedded pixels.

The matrix-to-vector conversion circuit 420 converts the bitmap image data values input over the signal lines 412 corresponding to the template shown in FIG. 5 into a five-bit parallel "vector" and a one-bit center pixel signal. The five-bit parallel vector is transferred over the signal lines 422 to a programmable logic array 430, while the one-bit center pixel signal is transmitted over a signal line 424 to the programmable logic array 430.

In the programmable logic array 430, the five-bit vector data is compared to the template shown in FIG. 5, to determine whether the center pixel of interest and the four surrounding neighbor pixels all have the same bit value and to determine if that data value has the correct relation to the embedded pixel template. In particular, if the embedded pixel template, or one of the embedded pixel templates if more than a single embedded pixel template is used, is matched, the programmable logic array 430 will output on a signal line 432 a non-zero value indicating either that the single template was matched, or the number or code of the template that was matched. Otherwise, if the single template is not matched, or none of a number of templates is not matched, the programmable logic array 430 outputs a zero code on the signal line 432. At the same time, the programmable logic array 430 directly outputs over a signal line 434 the one-bit center pixel signal, received from the matrix-to-vector conversion circuit 420 over the signal line 424, unchanged to a multiplexer 460.

When a zero code is output, a "zero" is passed from an OR gate 450 to a select input of the multiplexer 460 to enable the one-bit center pixel value to pass directly to the pulse-width, position-modulation (PWPM) driver 470 and on to the image forming engine 230 over the signal line 222. When a non-zero value is output on the signal line 432, the OR gate 450 outputs a "one" over the signal line 452 to the multiplexer 460. This causes the multiplexer 460 to select the output of the look-up table 440 on the signal line 442. In particular, the look-up table (LUT) 440 is a programmable look-up table where the n-bit input on the signal line 432 is used as an address. Based on the address supplied to the look-up table 440 on the signal line 432, the look-up table 440 outputs the appropriate PWPM signal on the signal line 442.

It should be appreciated that the look-up table 440 is preferably a programmable device, capable of storing data downloaded from the memory 250 to the look-up table 440 in response to a user input. Thus, upon the programmable logic array 430 identifying whether the center pixel of interest is an embedded pixel, the PWPM signal output by the look-up table 440 will result in the image data value of the center pixel of interest being altered, or set, to the image data value for a white pixel.

It should be appreciated that the above-outlined description has assumed the image tuning subsystem 400 is operating on a bitmap. FIG. 8 shows another preferred embodiment 500 of the image appearance tuning subsystem 210 that is particularly well suited for an image forming device 230 that is capable of rendering grayscale image data having two-bits per pixel.

In particular, in the preferred embodiment of the image appearance tuning subsystem 500 shown in FIG. 8, a multiple bit per pixel system requires modification of the programmable logic array structure shown in FIG. 7, as a programmable logic array is not well suited to non-binary inputs. Thus, FIG. 8 shows a block diagram of the image appearance tuning subsystem 500 that is particularly useful for two-bit per pixel image data. In particular, the image appearance tuning subsystem 500 is particularly useful for a dual-beam, under-filled raster output scanning printer. In particular, the image processing subsystem 210 receives the digital image data from the image source 240 and performs the required image processing functions.

Specifically, the incoming serial video stream at two-bits per pixel is processed through a series of FIFOs as previously described, to construct a square 3×3 image segment. The video path is then split into two separate paths, one for each of the high and low order bits. As described above with respect to FIG. 7, the two paths are input over the signal line 212 to a matrix-to-vector conversion circuit 510. The matrix-to-vector conversion circuit 510 outputs a resulting vector of five pixels, representing the high and low order bits, over a signal line 512 to the template matching block 510. The template matching circuit 510 is preferably implemented as a gate array. The six-bit output from the template matching circuit 520 is input over a signal line 522 to a look-up table 530 for interpretation. The values stored in the lookup table 530 are downloadable from the memory 250 over the signal line 252, preferably on an image-by-image basis, to obtain the desired output density characteristics. The eight-bit output signal produced by the look-up table 530 is output over a signal line 532 to a pulse-width, position-modulation (PWPM) circuit 540. The eight-bit output signal contains both pixel position and pixel width information to be interpreted by the pulse-width, position-modulation circuit 540. The pulse-width, position-modulation circuit 540 converts the eight-bit output signal into data suitable for printing by the image forming engine 230 and outputs that data over the signal line 222.

FIG. 9 shows yet another preferred embodiment 600 of the image appearance tuning subcircuit 210. In the preferred embodiment of the image appearance tuning subsystem 600, as shown in FIG. 9, the image processing subcircuit 210 outputs the multi-bit per pixel image data over the signal line 212 to the scan line buffer 610. The scan line buffer 610 outputs rasterized image signals over a signal line 612 to a template matching circuit 620. The template matching circuit 620 determines whether the scan line image data from the scan line buffer 610 matches the selected embedded pixel template input to the template matching circuit 620 from the memory 250, which is preferably a programmable read only memory (PROM) 650, over the signal line 252. As described above, the template matching circuit 620 outputs a six-bit signal over a signal line 622 to a look-up table 630. The data on the signal line 622 is based on the image data value of the center pixel of interest and the outcome of the template matching performed in the template matching circuit 620. The look-up table 630 then outputs the appropriate image data values over a signal line 632 to the pulse-width, position-modulation (PWPM) circuit 640, as described above. The data on the signal line 632 contains both pixel position and pixel width information to be interpreted by the pulse-width, position-modulation circuit 640. The pulse-width position-modulation circuit 640 then outputs the appropriate signals for driving the image forming device 230 over the signal line 222.

In particular, the values stored in the look-up tables 340, 440, 530 and 630 can be loaded from the memory 250. Alternatively, the values stored in the look-up tables 340, 440, 530 and 630 can be downloaded from the image data source 240 along with the image data. In this case, as shown in FIG. 4, the values can be input to the memory 250 from the image processing subsystem 210 over a signal line 254. The values can be input from the memory 250 to the image appearance tuning subsystem 220 over the signal line 252. In general, the values for the look-up tables 340, 440, 530 and 630 for converting embedded pixels are preferably stored in the memory 250, along with the values for the other appearance tuning operations described in the incorporated '470 and '297 patents.

Moreover, for the look-up tables 340, 530 and 630, there may be more than one set of look-up table values for converting the embedded pixels stored in the memory 250. These other sets are used to convert black pixels to gray pixels or gray pixels to lighter gray pixels, or the like. In this case, when the embedded pixel identification and modification process is not limited to converting black pixels to white pixels, the template matching circuits 330, 520 and 620 are programmable, and the memory 250 also stores the parameters for programming the programmable template matching circuits 330, 520 and 620.

It should be appreciated that, in the embodiments shown in FIGS. 7–9, if the other appearance tuning modes disclosed in the '470 and '297 patents are also implemented in the appearance tuning subsystem 300, the embedded black pixel condition will correspond to the "no match" condition relative to the other appearance tuning templates disclosed in the '470 and the '297 patents. In this case, the "no match" template can be used by the template matching circuits described above to generate and output the embedded black pixel code to the look-up tables described above.

Figure 10:
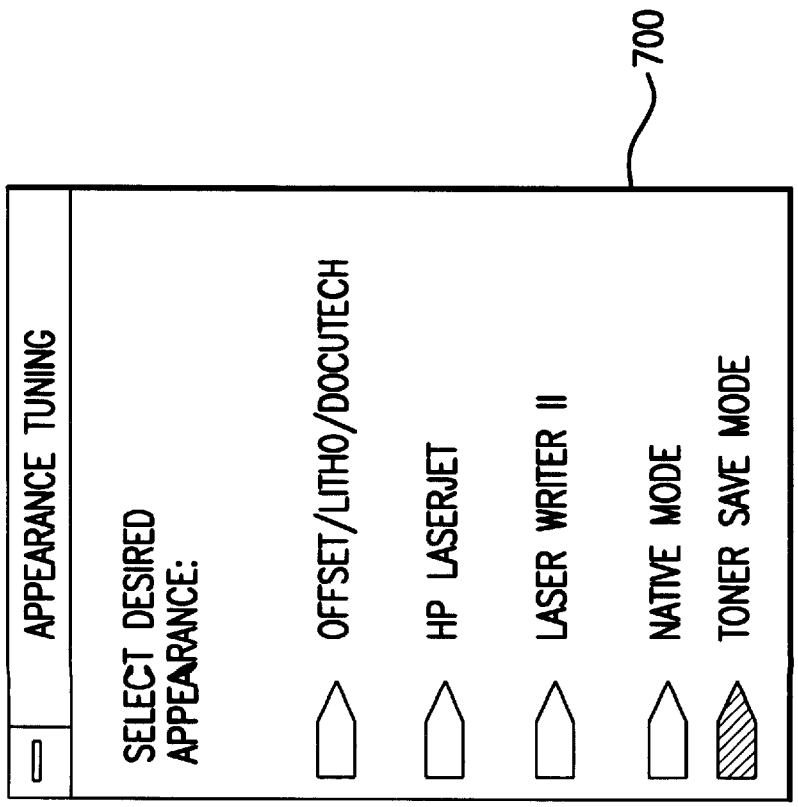
FIG. 10 is an exemplary display screen or graphical user interface for selecting the toner saving mode according to this invention.

In general, the PROM 650 stores up to n different sets of templates and corresponding entries to be used by the template matching circuit 620 and the look-up table 630, respectively. In particular, the PROM 650 stores the different templates and look-up table entries for the various appearance tuning modes shown in FIG. 10. As only the toner save mode of the various modes shown in the appearance tuning selection screen 700 shown in FIG. 10 is relevant to this invention, the other modes will not be described herein.

Figure 11:
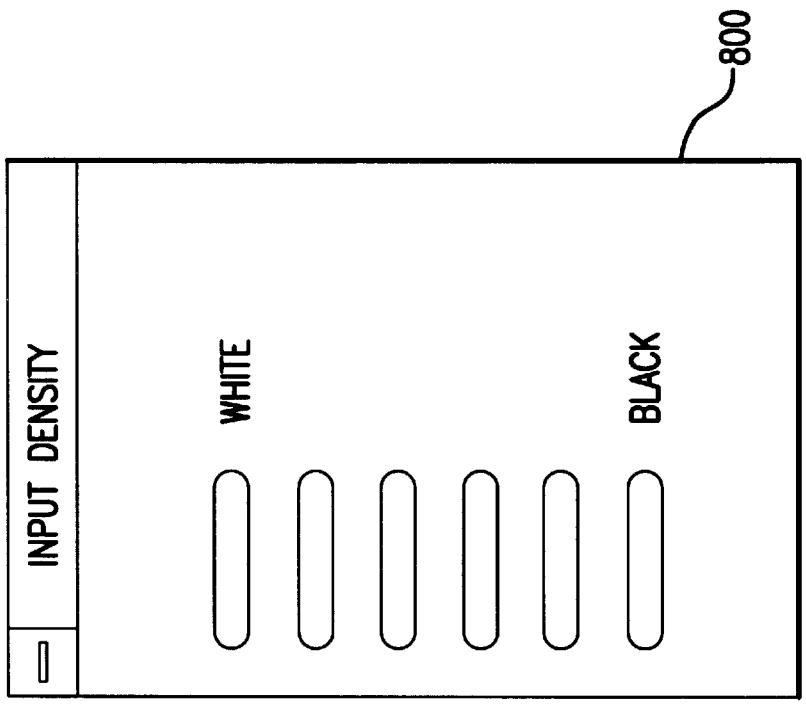
FIG. 11 is an exemplary display screen or graphical user interface for selecting the output level to which the embedded pixels will be modified according to this invention.

When the toner save mode is selected using the appearance tuning screen 700, the input density screen 800 shown in FIG. 11 may or may not be displayed, depending on whether the image forming device 230 is capable of printing multi-bit or single-bit image data. Obviously, if the image forming device 230 is only capable of printing binary image data, i.e., bitmap or black-and-white image data, there is no need to display the input density screen 800.

In this case, upon selection of the toner save mode using the appearance tuning screen 700, the PROM 650 will output the appropriate look-up table data to the look-up table 630 for converting black embedded pixels to white embedded pixels. Additionally, the template data for the toner save mode is downloaded to the template matching circuit 620, enabling the template matching circuit to locate embedded black pixels based on the downloaded template and image data value. In response, the image appearance tuning subsystem 600 will convert the image shown in FIG. 1 to the image shown in FIG. 3.

In contrast, if the image forming device 230 is able to print multi-bit image data, i.e., bytemaps, a number of different modes of operation of the toner save mode can be provided for the image appearance tuning subsystem 220. In a simplest mode, selection of the toner save mode using the appearance tuning screen 700 is limited to converting embedded black pixels to embedded white pixels, as in the bitmap environment described above. In more complex modes, the input density screen 800 shown in FIG. 11 can be used to select the image data value to be used in identifying embedded pixels. That is, depending on the particular image data value selected using input density screen 800, all embedded regions having image data values at least as dense as the selected image data value will be converted to white pixels. In this way, additional toner savings over merely converting the embedded black pixels to embedded white pixels can be achieved. In this case, the PROM 650 not only outputs the look-up table values to the look-up table 630 over the signal line 252, the PROM 650 also inputs over the signal line 252 the particular embedded pixel template and particular image data value to be used by the template matching circuit 620.

Figure 12:
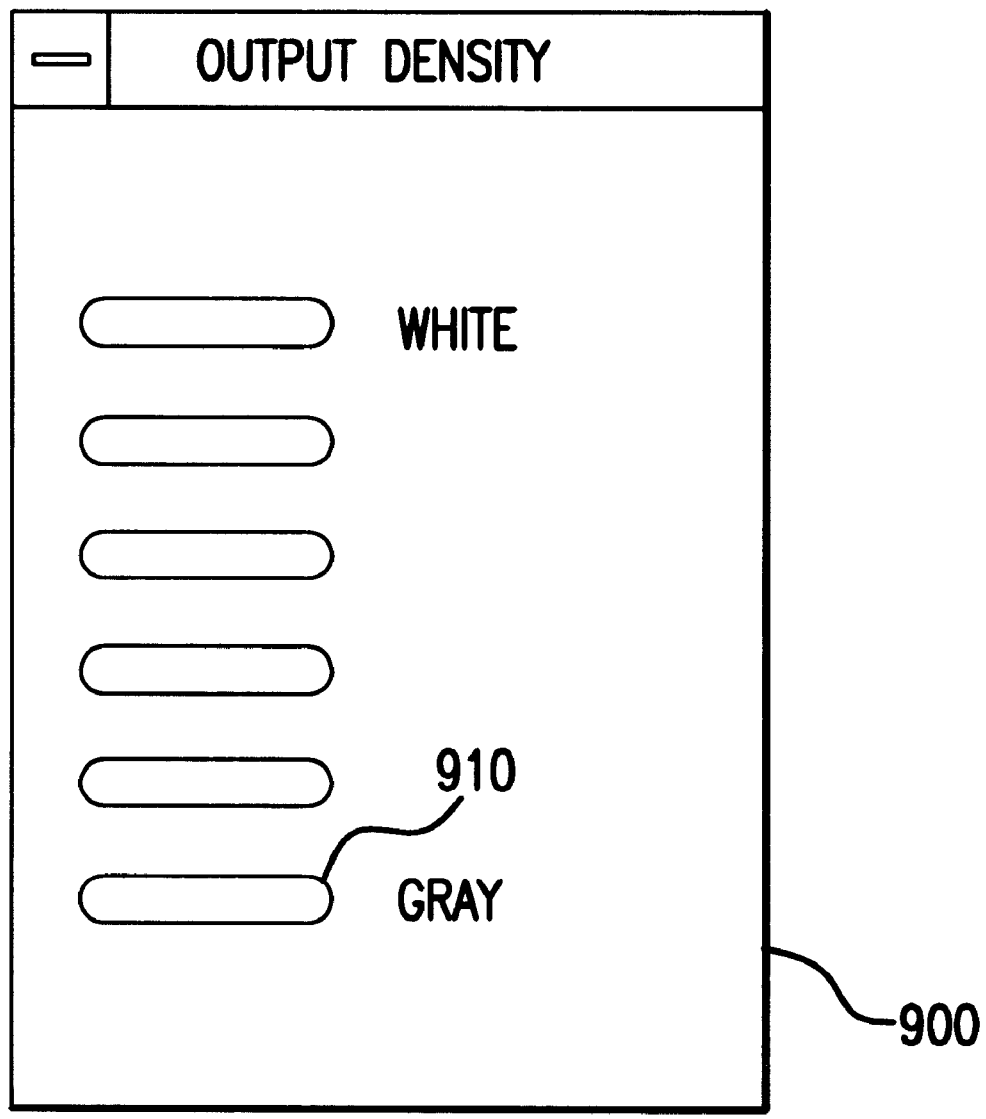
FIG. 12 is an exemplary display screen or graphical user interface for selecting the density level of the embedded pixels to be modified according to this invention.

Finally, in an even further sophisticated system, after the input density is selected using the input density screen 800, an output density could be selected using an output density screen 900, as shown in FIG. 12. In this case, the embedded pixels are not limited to being converted only to embedded white pixels. Rather, the output density of the embedded pixels can be selected using the output density screen 900. In this case, the grayest gray value option 910 could be made to depend upon the selected input density image data value that will be converted, or the grayest gray value option 910 could be predetermined. This will allow embedded black pixels to be converted to embedded lighter gray pixels, as shown in FIGS. 1 and 2. By providing these input and output density options, the user is able to select the desired amount of toner savings while maintaining some control over the appearance of the resulting image. It should also be appreciated that only the output density selection option could be provided. In this case, while only embedded black pixels would be located, the user can control the output density to which the embedded black pixels are converted.

It should be appreciated that the display or graphical user interface screens shown in FIGS. 10–12 can either be displayed on a display screen of a printer or electronic copier or can be part of a graphical user interface displayed on the display screen of a general purpose computer or the like for providing output commands to a printer or an electronic copier to be used when printing an electronic image transmitted from the user's general purpose computer.

Additionally, these data values may be selectively downloaded in response to a user-identified characteristic representative of the lightness or darkness of the output to be produced. Moreover, these data values may be supplied to the image appearance tuning subsystem 220 either as part of, or in addition to, the bitmap or bytemap image data to be printed.

In any of the above-described cases, once selected, the appropriate look-uptable values, and possibly the appropriate template values, are retrieved from the memory device 250 of the image forming apparatus 200 and input into the look-up table 340, 530 or 630, and possibly into the template matching circuit 330, 520 or 620.

Figure 13:
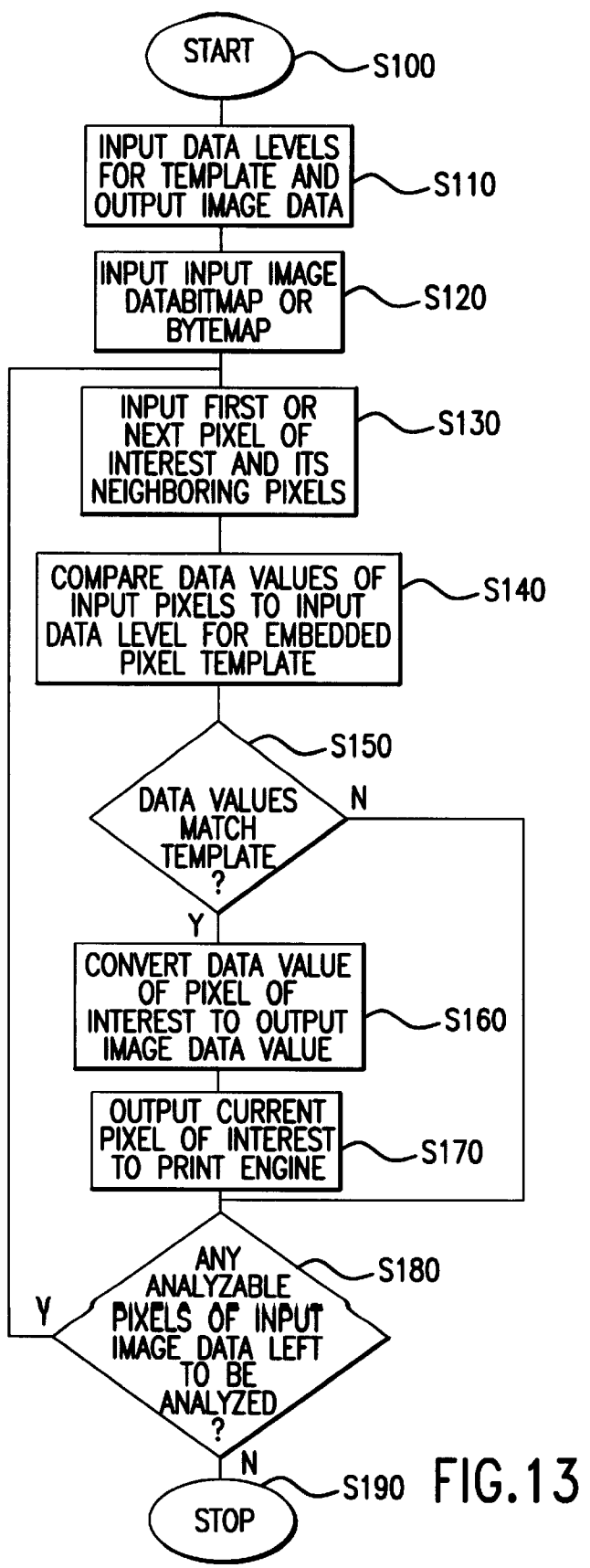
FIG. 13 is a flowchart outlining one embodiment of the embedded pixel identifying and modifying method according to this invention.

FIG. 13 outlines one preferred method for locating and converting embedded pixels according to this invention. Starting in step S100, control continues to step S110. In step S110, the data levels for the embedded pixel template and for the output image data are selected or input. It should be appreciated that, in some embodiments of this invention, those embodiments may be limited to identifying black embedded pixels and converting those black embedded pixels into white pixels. In this case, step S110 would be skipped. Such embodiments include, for example, when the image forming device 230 is capable only of full-on or full-off operation, such that only full white or full black pixels can be formed. Similarly, if the particular embodiment of this invention does not allow for the input level or the output level to be changed, i.e., that level is predetermined, that portion of step S110 would be skipped.

Next, in step S120, the input image data bitmap or bytemap is input. It should also be appreciated that steps S110 and S120 can be performed in the reverse order, such that the image input data is input before the data levels for the template and output image data are selected or input. Control then continues to step S130.

In step S130, the first or next pixel of interest and its neighboring pixels are input. In particular, in the first pass through steps S130–S180, the first pixel of interest of the input image data and its neighboring pixels will be selected. In subsequent passes through steps S130–S180, the next pixel of interest and its neighboring pixels will be input, on a pixel-by-pixel basis, first within a single scan line, and then on a scan line-by-scan line basis.

Next, in step S140, the data values of the current pixel of interest and its neighboring pixels are compared to the data level for the embedded pixel template shown in FIG. 5. As set forth above with respect to step S110, the data level for the embedded pixel template is either predetermined, or has been selected or input in step S110.

Then, in step S150, the image appearance tuning subsystem 220 determines if the data values of the current pixel of interest and its neighboring pixels are all equal to the data level for the embedded pixel template. It should also be appreciated, as described above with respect to FIGS. 10–12, that, in step S150, the image appearance tuning subsystem 220 could also determine if all of the data levels of the input pixel of interest and its neighboring pixels are equal to each other and are at least as dense as the data level for the embedded pixel template. If the comparison performed in step S150 is true, i.e., the pixel of interest is an embedded pixel, control continues to step S160. Otherwise, if the comparison performed in step S150 is false, i.e., the pixel of interest is not an embedded pixel, control jumps to step S180.

In step S160, the data value of the current pixel of interest is converted to either the predetermined output image data value or the input or selected output image data value. Then, in step S170, the current pixel of interest, having the output image data value, is output to the image forming engine 230 of the image forming device 200. Next, in step S180, the image appearance tuning subsystem 220 determines if there is any analyzable pixels of the input image data left to be analyzed. If so, control returns to step S130 for processing of these additional pixels. Otherwise, if the entire analyzable portion of the image data has been analyzed, control continues to step S190, where the control routine stops.

As indicated above in step S180, because of the embedded pixel template shown in FIG. 5, the top and bottom scan lines of the input image data bitmap or bytemap, and the leftmost and rightmost pixels of each scan line are not analyzable, because at least one of the neighboring pixels of each such pixel does not exist.

It should also be appreciated that, if the embedded pixel matching process is combined in the image appearance tuning subsystem 220 with the various image appearance tuning processes disclosed in the incorporated '470 and '297 patents, one or more additional templates would be used in the comparing step S140. In this case, a number of additional template matching determining steps, similar to step S150, and steps corresponding to the resulting processing steps S160 and S170 would be incorporated into the flowchart shown in FIG. 13. Thus, it would be possible to perform any number of different image appearance tuning processes along with the embedded pixel identifying and converting processes shown in FIG. 13.

As described above, the template matching circuit can be implemented to find a match between the data value of the pixel of interest and the neighboring pixels and the embedded pixel template only if the data values of the pixel of interest and the neighboring pixels are equal to the data value of the embedded pixel template. Alternatively, the template matching circuit can be implemented to find a match if the data values of the pixel of interest and the neighboring pixels are equal to each other and are either equal to the data value of the embedded pixel template or are between the data value of the embedded pixel template and the data value of a black pixel.

It should be appreciated that a black pixel can be defined by a maximum data value or a minimum data value. In the first case, when the data value of the pixel of interest and the neighboring pixels is not equal to the data value of the embedded pixel template, the template matching circuit will find a match if the data value of the pixel of interest and the neighboring pixels is greater than the data value of the embedded pixel template. In the second case, when the data value of the pixel of interest and the neighboring pixels is not equal to the data value of the embedded pixel template, the template matching circuit will find a match if the data value of the pixel of interest and the neighboring pixels is less than the data value of the embedded pixel template.

It should be appreciated that, in a number of preferred embodiments, the embedded pixel matching process and apparatus disclosed herein are incorporated into the general appearance tuning apparatus disclosed in the incorporated '470 and '297 patents. However, it should be appreciated that it is not necessary to use the embedded pixel matching and converting apparatus and method disclosed herein with such additional image appearance tuning processes disclosed in the '470 and '297 patents.

As shown in the '470 and '297 patents, this invention is preferably implemented using various discrete hardware circuits, such as programmable logic arrays and application specific integrated circuits (ASICs). However, it should be appreciated that the image processing subsystem 210 and the image appearance tuning subsystem 220 can be more generally implemented, either individually or integrally, on a general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 13, can be used to implement either the image appearance tuning subsystem 220 and/or the method outlined in FIG. 13.

Finally, while FIG. 4 shows the image processing subsystem 210 and the image appearance tuning subsystem 220 as part of the image forming device 200, it should also be appreciated that the image processing and image appearance tuning processes described herein can be performed in a general purpose computer or other image processing structure prior to the altered image data being transferred by the image data source 240 to the image forming engine 230.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. A method for converting data values of embedded pixels of an image, the embedded pixels having data values at least equal to a first data value, the method comprising:

inputting a pixel of interest and a number of pixels neighboring the pixel of interest;

comparing data values of the pixel of interest and the neighboring pixel to at least one embedded pixel template;

determining, based on the comparison, if the pixel of interest is an embedded pixel having a data value at least equal to the first data value;

converting, when the pixel of interest is an embedded pixel having a data value at least equal to the first data value, the data value of the pixel of interest to a second data value representative of a lower density image pixel; and repeating the inputting, comparing, determining and converting steps for at least one other pixel of the image.

2. The method of claim 1, further comprising inputting or selecting first data representing the first data value.

3. The method of claim 2, wherein inputting or selecting the first data comprises inputting the first data from a user.

4. The method of claim 2, wherein inputting or selecting the first data comprises selecting the first data through a display screen or graphical user interface screen.

5. The method of claim 1, further comprising inputting or selecting second data representing the second data value.

6. The method of claim 5, wherein inputting or selecting the second data comprises inputting the second data from a user.

7. The method of claim 6, wherein inputting or selecting the second data comprises selecting the second data through a display screen or graphical user interface screen.

8. The method of claim 1, wherein the first data value is predetermined.

9. The method of claim 1, wherein the second data value is predetermined.

10. The method of claim 1, wherein determining if the pixel of interest is an embedded pixel comprises determining if the data value of the pixel of interest and the neighboring pixels are all equal to the first data value.

11. The method of claim 1, wherein determining if the pixel of interest is an embedded pixel comprises:

determining if the data values of the neighboring pixels are all equal to the data value of the pixel of interest; and determining if the data value of the pixel of interest is at least equal to the first data value.

12. The method of claim 11, wherein determining if the data value of the pixel of interest is at least equal to the first data value includes determining, when the data value of the pixel of interest is not equal to the first data value, if the data value of the pixel of interest is between the first data value and the data value of a black pixel.

13. The method of claim 11, wherein determining if the data value of the pixel of interest is at least equal to the first data value includes determining, when the data value of the pixel of interest is not equal to the first data value, if the data value of the pixel of interest is less than the first data value.

14. The method of claim 11, wherein determining if the data value of the pixel of interest is at least equal to the first data value includes determining, when the data value of the pixel of interest is not equal to the first data value, if the data value of the pixel of interest is greater than the first data value.

15. The method of claim 1, wherein the first data value represents a black image pixel.

16. The method of claim 1, wherein the second data value represents a white image pixel.

17. An apparatus that converts data values of embedded pixels of an input image to data values representing a lower density comprising:

an image data storing device;

a template-matching circuit including at least one embedded pixel template, the template-matching circuit inputting image data representing a pixel of interest and a number of neighboring pixels and outputting a first signal having an image, wherein a value of the first signal indicates whether the pixel of interest is an embedded pixel based on a comparison between the at least one embedded pixel template and the pixel of interest and neighboring pixels; and a look-up-table circuit that inputs the first signal and an image value of the pixel of interest, and outputs a second signal having an image value, wherein the image value of the second signal is representative of a lower density image pixel when the pixel of interest is an embedded pixel.

18. The embedded pixel converting apparatus of claim 17, further comprising a pulse-width, position-modulation circuit that inputs the second signal and outputs a pulse width and position modulated signal.

19. The embedded pixel converting apparatus of claim 18, further comprising an image forming engine that inputs the pulse width and position modulated signal and outputs an image having embedded pixels printed at a lower density than the data values for the embedded pixels in the output image.

* * * * *